United States Patent
Mita et al.

[11] Patent Number: 5,959,675
[45] Date of Patent: Sep. 28, 1999

[54] IMAGE COMPRESSION CODING APPARATUS HAVING MULTIPLE KINDS OF COEFFICIENT WEIGHTS

[75] Inventors: Hideaki Mita, Kobe; Tatsushi Bannai, Sakai, both of Japan

[73] Assignee: Matsushita Electric Industrial Co., Ltd., Osaka, Japan

[21] Appl. No.: 08/573,506

[22] Filed: Dec. 15, 1995

[30] Foreign Application Priority Data

Dec. 16, 1994 [JP] Japan .................................. 6-312808

[51] Int. Cl.⁶ ...................................................... H04N 7/30
[52] U.S. Cl. ........................................... 348/405; 348/420
[58] Field of Search ............................ 348/384, 390–393, 348/395, 396, 400–403, 405, 407–412, 415, 420; 382/232, 236, 238, 239, 248–250; H04N 7/133, 7/30

[56] References Cited

U.S. PATENT DOCUMENTS

| | | | |
|---|---|---|---|
| 4,734,767 | 3/1988 | Kaneko et al. | 348/400 |
| 4,920,426 | 4/1990 | Hatori et al. | 348/405 |
| 5,006,931 | 4/1991 | Shirota | 348/408 |
| 5,051,840 | 9/1991 | Watanabe et al. | 382/239 |
| 5,073,821 | 12/1991 | Juri | 348/405 |
| 5,089,889 | 2/1992 | Sugiyama | 348/415 |
| 5,109,451 | 4/1992 | Aono et al. | 382/248 |
| 5,150,208 | 9/1992 | Otaka et al. | 348/420 |
| 5,175,631 | 12/1992 | Juri et al. | 348/420 |
| 5,333,013 | 7/1994 | Enari et al. | 348/405 |
| 5,337,087 | 8/1994 | Mishima | 348/405 |
| 5,543,844 | 8/1996 | Mita et al. | 348/405 |
| 5,543,845 | 8/1996 | Asamura et al. | 348/407 |

FOREIGN PATENT DOCUMENTS 7-298194  11/1995  Japan .

OTHER PUBLICATIONS

T. Endo, "International Standard Coding Method for Color Still Image", The Journal of The Institute of Television Engineers of Japan, vol. 46, No. 8, pp. 1021–1024, 1992 (partial translation).

M. Sasaki et al., "Bit–Rate Control for the JPEG Coding", ITEC '92: 1992 ITE Annual Convention, 16–15, 1992 (no translation) pp. 323–324.

K. Ohshima et al., "An Adaptive DCT Coding for HDTV Digital VCR", The Convention of The Institute of Electronics, Information and Communication Engineers of Japan, D–220, 1990 pp. 6–222 (partial translation).

*Primary Examiner*—Richard Lee
*Attorney, Agent, or Firm*—Ratner & Prestia

[57] ABSTRACT

A rate control for a VCR or the like records digitized image data by compression coding technologies so that the code amount of the compression coded data becomes a predetermined code amount or less. Even in the case where an interleave is performed among a plurality of blocks, the prediction error of the code amount after the interleave can be reduced and the rate control can be precisely performed by quantizing so that the same quantization table is assigned to each of the interleaved blocks in pre-scanning in the pre-stage of an interleave memory.

2 Claims, 12 Drawing Sheets

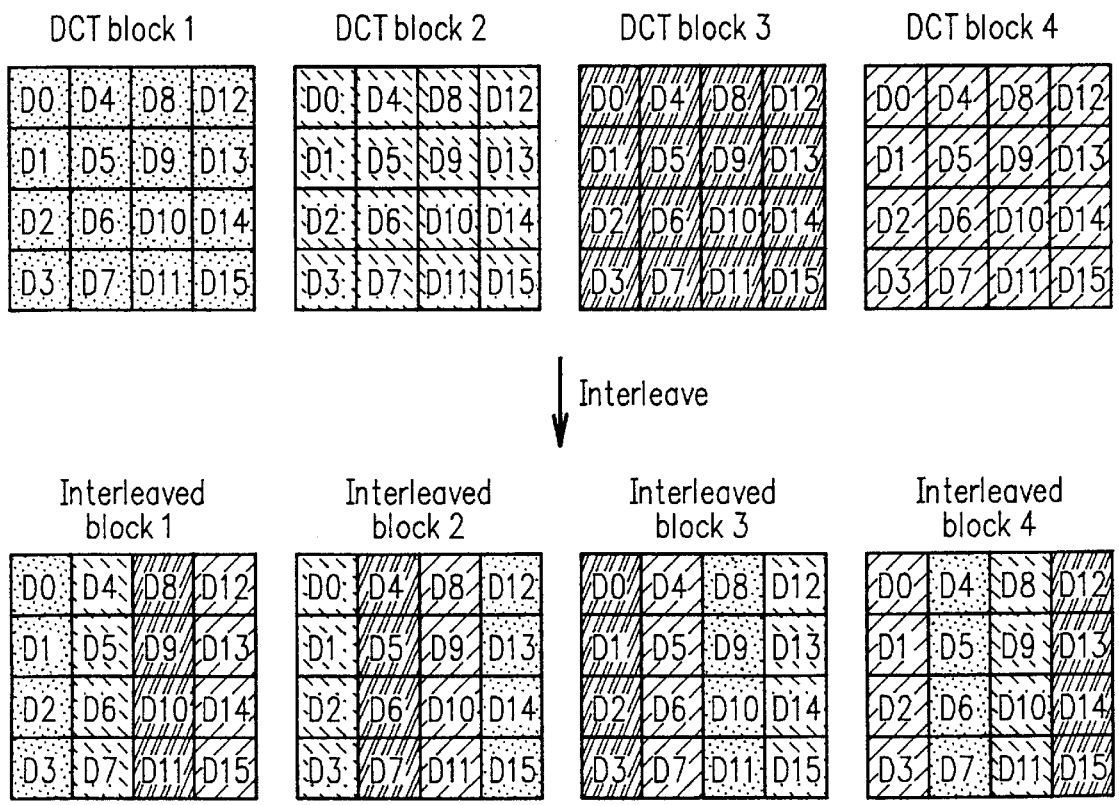

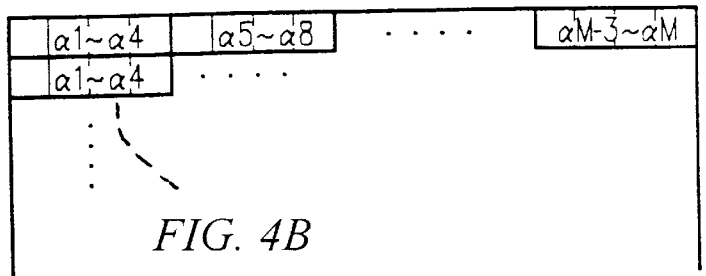
FIG. 4A
FIG. 4B
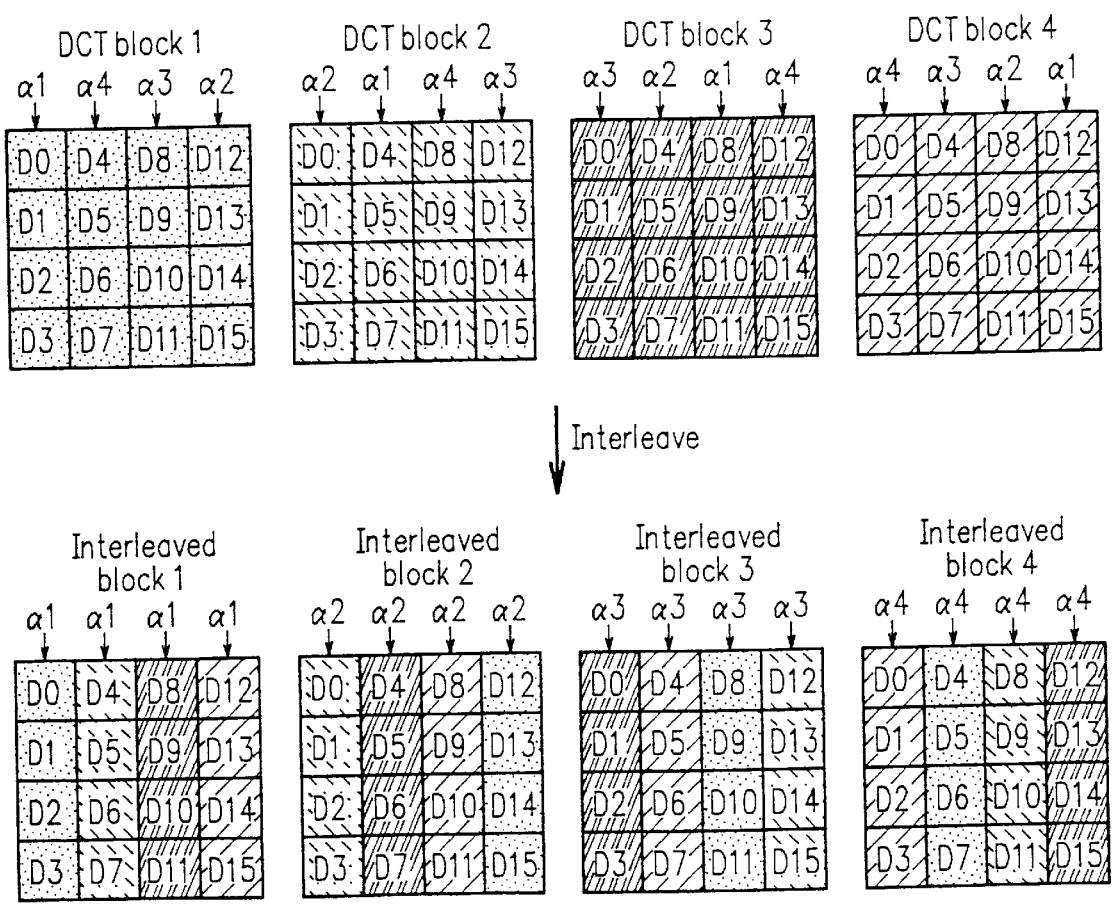
FIG. 4B

FIG. 7

YCT0

| 1 | 1 | 1 | 1 |
|---|---|---|---|
| 1 | 1 | 1 | 1 |
| 1 | 1 | 1 | 1 |
| 1 | 1 | 1 | 1 |

YCT1

| 1 | 1 | 1 | 1 |
|---|---|---|---|
| 1 | 1 | 1 | 1 |
| 1 | 1 | 1 | 0.7 |
| 1 | 1 | 0.7 | 0.7 |

YCT2

| 1 | 1 | 1 | 1 |
|---|---|---|---|
| 1 | 1 | 1 | 0.7 |
| 1 | 1 | 0.7 | 0.6 |
| 1 | 0.7 | 0.6 | 0.6 |

CCT0

| 1 | 1 | 1 | 1 |
|---|---|---|---|
| 1 | 1 | 1 | 1 |
| 1 | 1 | 1 | 0.7 |
| 1 | 1 | 0.7 | 0.7 |

CCT1

| 1 | 1 | 1 | 1 |
|---|---|---|---|
| 1 | 1 | 1 | 0.7 |
| 1 | 1 | 0.7 | 0.6 |
| 1 | 0.7 | 0.6 | 0.6 |

FIG. 8

IMAGE COMPRESSION CODING APPARATUS HAVING MULTIPLE KINDS OF COEFFICIENT WEIGHTS

BACKGROUND OF THE INVENTION

1. Field of the Invention

The present invention relates to an apparatus for rate control for a video cassette recorder (VCR) or the like for recording a digitized image data by compression coding technologies so that the code amount of the compression coded data becomes a predetermined code amount or less.

2. Description of the Related Art

A compression coding technology utilizing an orthogonal transform in combination with a variable-length coding is regarded as a high-efficiency compression coding technology for a natural image. The adoption of this method as an international standard of a color natural image coding method was decided (see the Journal of the Institute of Television Engineers of Japan, Vol 46, No. 8, pp. 1021–1024 (1992)).

In such a compression method, since the variable-length coding is performed, the code amount is varied in accordance with an image to be compressed. On the contrary, in a system such as a VCR, the recording operation is required to be performed at a constant code rate, and therefore, the code amount is required to be controlled for each image to be compressed. A rate control method for such a purpose is proposed, for example, in "Bit-rate Control for the JPEG Coding", 16–15, Annual Convention of The Institute of Television Engineers of Japan, 1992.

According to the method, first, a plurality of blocks in one field are linearly quantized using M (where, M is a natural number) different kinds of scale factors $\alpha_1$ to $\alpha_M$ (where $\alpha_1 < \alpha_2 < \ldots < \alpha_M$) for the respective blocks. Then, the code amount of two-dimensional Huffman coded variable-length data in one block is calculated. At this time, the summation values $N_1$ to $N_M$ of the M kinds of code amounts corresponding to the respective scale factors are calculated and a scale factor for setting the code amount of one field to be a predetermined value is predicted based on the relationship between the scale factor and the code amount.

On the other hand, an interleave coding method has been proposed separately from the above-described rate control method. According to the interleave coding method, in order to prevent a part of image data from being unavailable on a block basis even when an error is generated in the compressed data, the blocks are rearranged by interleaving the data among a plurality of DCT blocks, and the data is coded and transmitted in the rearranged interleaved blocks (see, for example, Japanese Patent Laid-Open Publication No. 7-298194).

Furthermore, in order to realize an adaptive compression coding in accordance with local features of an image, a method for improving the quality of the image by categorizing the respective DCT blocks based on the features of the image in the blocks and optimizing the quantization characteristics in accordance with the categories has been proposed (see, for example, "An Adaptive DCT Coding for HDTV Digital VCR", Convention of the Institute of Electronics, Information and Communication Engineers of Japan, D-220, autumn 1990).

However, in the case of applying the above-described rate control method to the interleave coding method in which the DCT blocks are interleaved, it is necessary to predict the code amounts of the interleaved blocks. Therefore, it is difficult to perform such a prediction coding by conventional technologies. On the other hand, it is possible to perform a pre-scanning after the interleave is performed. However, in such a case, a memory for delaying the interleaved data is also required to be provided in addition to a memory for performing the interleave.

Moreover, in the case of applying the rate control method to the adaptive processing method, the quantization characteristics become different in the respective DCT blocks. Therefore, it is impossible to perform the rate control by applying a uniform scale factor to the entire image unlike the above-described rate control method.

SUMMARY OF THE INVENTION

The image compression coding apparatus of the invention includes an orthogonal transformer for orthogonally transforming an input image data in a plurality of blocks so as output transform coefficients; a memory for rearranging interleaved blocks by rearranging locations of the transform coefficients output from the orthogonal transformer among the plurality of blocks and reading out the transform coefficients of each of the interleaved blocks in a predetermined order; a first quantizer for quantizing the transform coefficients of the interleaved blocks output from the memory; a coder for variable-length coding an output of the first quantizer; a second quantizer for quantizing the transform coefficients output from the orthogonal transformer by assigning one of M kinds of quantization tables following a predetermined rule so that the same quantization table is assigned to the same one of the transform coefficients constituting the interleaved blocks; and a rate controller for calculating a code amount obtained when an output of the second quantizer is variable-length coded for the respective interleaved blocks and predicting M kinds of code amounts obtained when one screen is quantized by the M kinds of quantization tables based on results of the calculation, so as to determine a quantization table for setting the code amount of the one screen to be a predetermined code amount and output the quantization table to the first quantizer.

The image compression coding apparatus according to another aspect of the invention includes an orthogonal transformer for orthogonally transforming an input image data in a plurality of blocks so as output transform coefficients; a first memory for rearranging interleaved blocks by rearranging locations of the transform coefficients output from the orthogonal transformer among the plurality of blocks and reading out the transform coefficients of each of the interleaved blocks in a predetermined order; a first quantizer for quantizing the transform coefficients of the interleaved blocks output from the memory; a coder for variable-length coding an output of the first quantizer; a second quantizer for quantizing the transform coefficients output from the orthogonal transformer by assigning one of M kinds of quantization tables following a predetermined rule so that the same quantization table is assigned to the same one of the transform coefficients constituting the interleaved blocks; a class detector for outputting a class data representing a level of a data output from the second quantizer; a second memory, to which the class data is input, for rearranging locations of the class data in an order of the interleave; and a rate controller for calculating a code amount obtained when the class data output from the second memory is variable-length coded for the respective interleaved blocks and predicting M kinds of code amounts obtained when one screen is quantized by the M kinds of quantization tables based on results of the calculation, so as to determine a quantization table for setting the code amount of the one screen to be a predetermined code amount and output the quantization table to the first quantizer.

The image compression coding apparatus according to still another aspect of the invention includes an orthogonal transformer for orthogonally transforming an input image data in a plurality of blocks; a category detection means for detecting features of the input image data in the plurality of blocks so as to class the plurality of blocks into L kinds of categories corresponding to the features; a weighting means for applying to the transform coefficients output from the orthogonal transformer L kinds of weights corresponding to the categories; a quantizer for quantizing the weighted transform coefficients; a coder for variable-length coding an output of the quantizer; and a rate controller for determining a quantization table for setting the code amount of one screen to be a predetermined code amount and outputting the quantization table to the quantizer.

The image compression coding apparatus according to still another aspect of the invention includes an orthogonal transformer for orthogonally transforming an input image data in a plurality of blocks; a category detection means for detecting features of the input image data in the plurality of blocks so as to class the plurality of blocks into L kinds of categories corresponding to the features; a weighting means for applying to transform coefficients output from the orthogonal transformer L kinds of weights corresponding to the categories; a memory, into which the weighted transform coefficients are written, for reading the transform coefficients in a predetermined order; a first quantizer for quantizing a data output from the memory; a coder for variable-length coding an output of the first quantizer; a second quantizer for quantizing the weighted transform coefficients by assigning one of M kinds of quantization tables following a predetermined rule; and a rate controller for calculating a code amount obtained when an output of the second quantizer is variable-length coded and predicting M kinds of code amounts obtained when one screen is quantized by the M kinds of quantization tables based on results of the calculation, so as to determine a quantization table for setting the code amount of the one screen to be a predetermined code amount and output the quantization table to the first quantizer.

In one embodiment, the L kinds of weights have different weighting characteristics with respect to frequency regions in the orthogonal transform.

In another embodiment, the quantization tables have respectively different quantization characteristics in frequency regions in the orthogonal transform.

In still another embodiment, the L kinds of weights are applied to a luminance signal and a chrominance signal so that the two kinds of signals have different weighting characteristics.

In still another embodiment, the number L of the kinds of weights to be applied to the luminance signal is different from the number L of the kinds of weights to be applied to the chrominance signal.

The image compression coding apparatus according to still another aspect of the invention includes an orthogonal transformer for orthogonally transforming an input image data in a plurality of blocks; a memory, into which transform coefficients output from the orthogonal transformer are written, for reading the transform coefficients in a predetermined order; a first quantizer for quantizing a data output from the memory; a coder for variable-length coding an output of the first quantizer; a buffer memory for writing a data output from the coder therein and then outputting the data at a predetermined code rate; a code amount summing circuit for summing code amounts of the data output from the coder; a second quantizer for classing the transform coefficients output from the orthogonal transformer into K kinds of groups in accordance with an order of the data output from the memory and quantizing respective blocks included in each of the groups by assigning one of M kinds of quantization tables to each of the blocks with a quantization coefficient; a code amount calculator for calculating the code amount of each block when an output of the second quantizer is variable-length coded; an initial quantization table detector for predicting M kinds of code amounts obtained when one screen is quantized by the M kinds of quantization tables based on the code amount of each block output from the code amount calculator, so as to determine a quantization table (an initial quantization table) for setting the code amount of the one screen to be a predetermined code amount; a group code amount calculator for distributing the predetermined code amount among the M kinds of blocks so as to correspond to a number of the blocks to which the M kinds of quantization tables are assigned, normalizing a sum of the block code amounts of the K kinds of groups output from the code amount calculator by the distributed code amount in each of the M kinds of quantization tables which have been assigned to the blocks so as to calculate the K kinds of code amounts, and predicting the normalized sum of the M kinds of code amounts of each group as a target code amount of each group when the group is coded by the initial quantization table; and a quantization table corrector for correcting the quantization tables of the first quantizer by correcting the initial quantization table with a prediction error between an actual code amount summed by the code amount summing circuit and the target code amount every time the data of each group is output from the coder.

The image compression coding apparatus for dividing one screen into a plurality of (or a number N of) channels following a predetermined rule and compressing each of the N channels so that each channel has a predetermined code amount according to another aspect of the invention includes an orthogonal transformer for orthogonally transforming an input image data in a plurality of blocks of each channel; a memory for delaying transform coefficients output from the orthogonal transformer; a quantizer for quantizing a data output from the memory; a coder for variable-length coding an output of the quantizer; and a buffer memory for writing a data output from the coder therein and then outputting the data at a constant code rate. In the image compression coding apparatus, a quantization table for setting a code amount of one screen to be a predetermined code amount using the transform coefficients output from the orthogonal transformer is obtained for each of the N channels, and the N kinds of quantization tables corresponding to the respective channels are output to the quantizer when a dispersion of the calculated N kinds of quantization tables is large, or an average of the N kinds of quantization tables is calculated and determined as an averaged quantization table commonly used for all the channels and output to the quantizer when the dispersion of the calculated N kinds of quantization tables is small.

Under these configurations, even when a coding is performed by interleaving the blocks or when an adaptive coding is performed on a block basis, the code amount is precisely predicted, so that the precision in controlling the code amount is improved and the image quality is improved.

Thus, the invention described herein makes possible the advantage of providing an image compression coding apparatus allowing for the improvement of the precision in controlling the code amount for a block interleave method, an adaptive processing method, and the like.

This and other advantages of the present invention will become apparent to those skilled in the art upon reading and understanding the following detailed description with reference to the accompanying figures.

BRIEF DESCRIPTION OF THE DRAWINGS

FIG. 2 shows the quantization steps for respective DCT coefficients.

FIG. 3 shows the interleave operation of the DCT coefficients.

FIGS. 4A and 4B show the assignment of the scale factors to the interleaved blocks.

FIG. 7 shows the weighting operation of the DCT coefficients.

FIG. 8 shows the assignment of the scale factors to the respective blocks.

DESCRIPTION OF THE PREFERRED EMBODIMENTS

Figure 1:
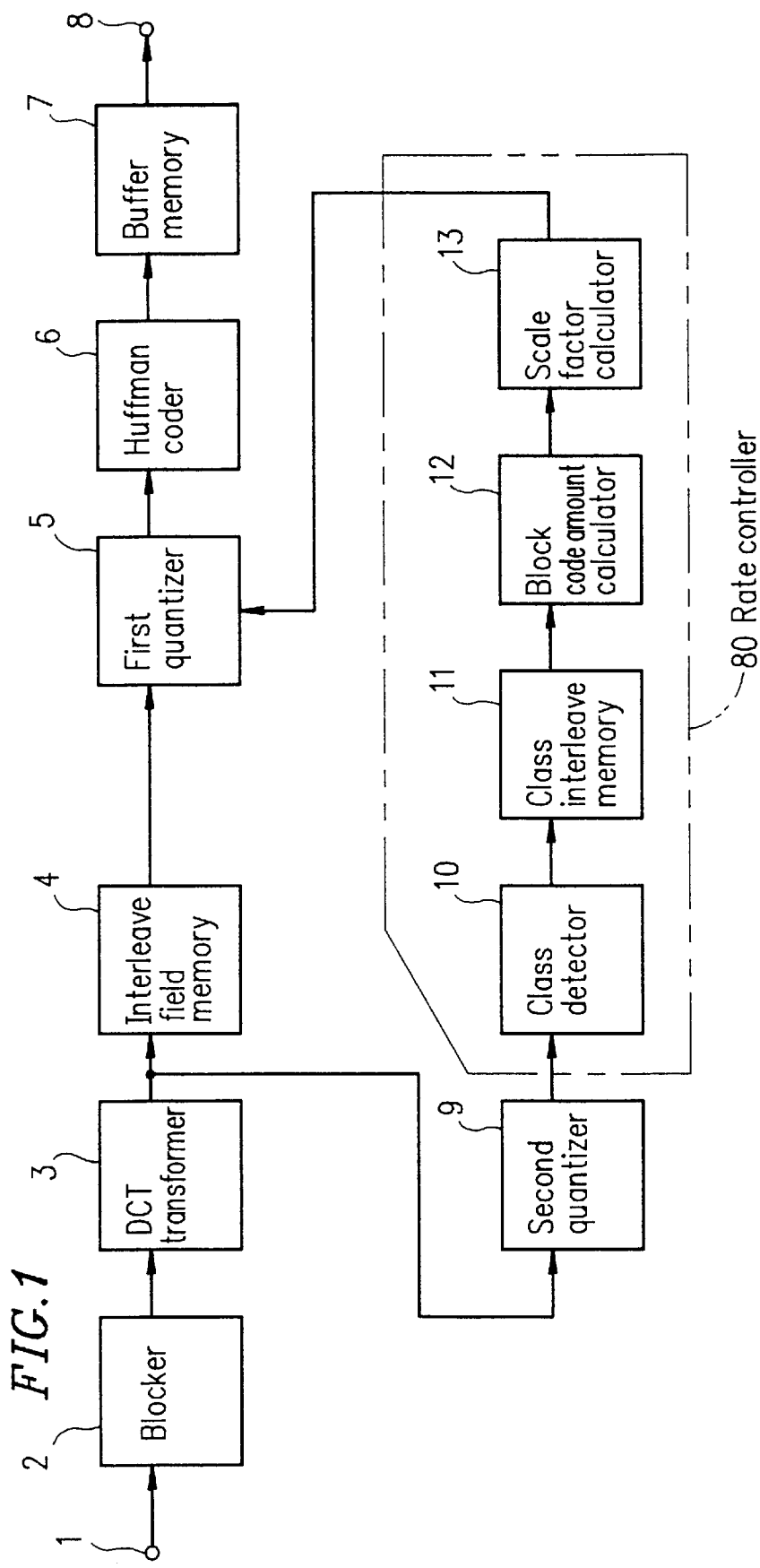
FIG. 1 is a block diagram showing a configuration for an image compression coding apparatus according to a first example of the present invention.

Hereinafter, examples of the present invention will be described with reference to the accompanying drawings. The same reference numerals represent the same element.

EXAMPLE 1

Figure 5:
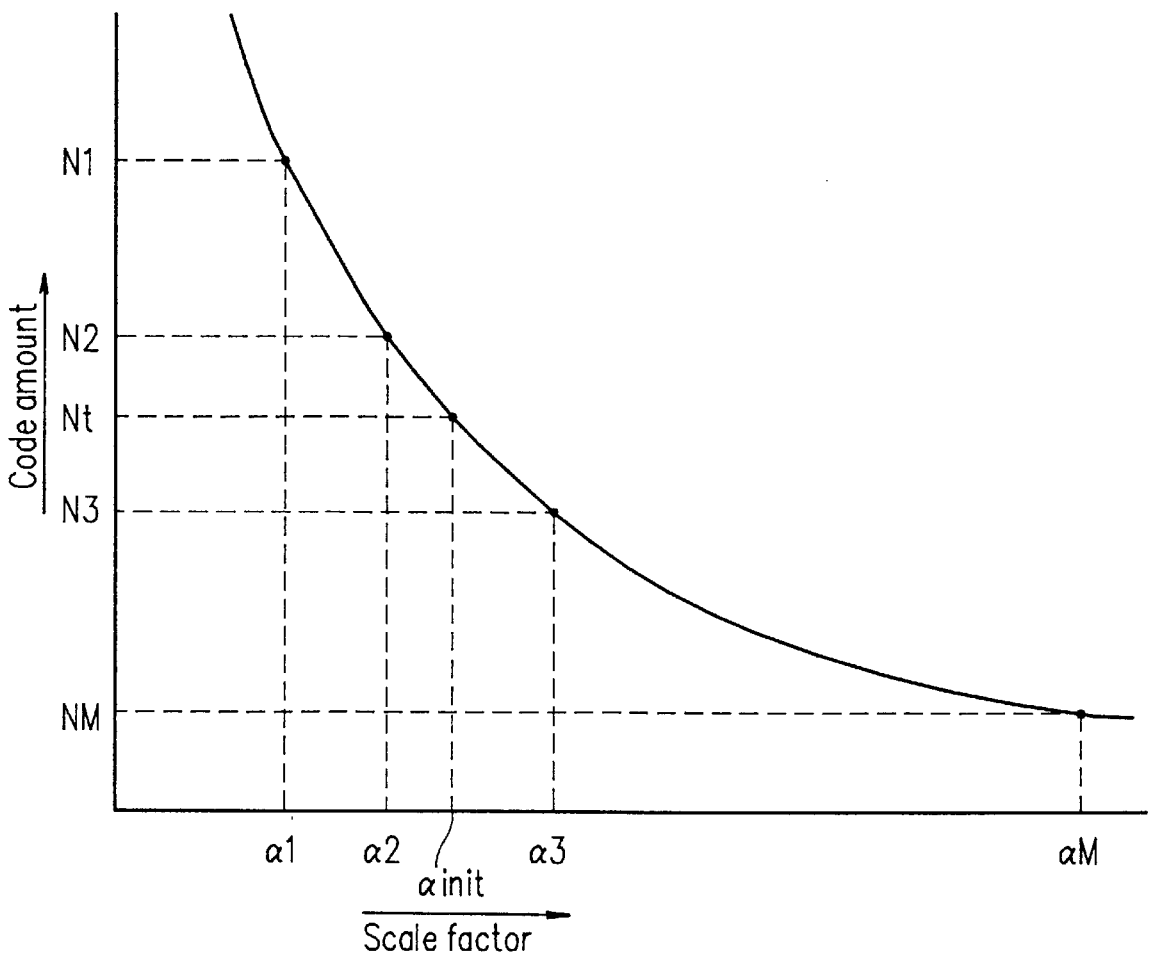
FIG. 5 is a graph showing the relationship between the scale factor and the code amount in one field.

FIG. 1 is a block diagram showing a configuration for an image compression coding apparatus according to a first example of the present invention; FIG. 2 shows the quantization steps for respective discreet cosine transform (DCT) coefficients; FIG. 3 shows the interleave of the DCT coefficients; FIG. 4 shows the assignment of the scale factors to the blocks; and FIG. 5 is a graph showing the relationship between the scale factor and the code amount in one field.

As shown in FIG. 1, the image compression coding apparatus includes: an input terminal 1 for receiving an image data; a blocker 2 for dividing the image data of one field into 4×4 DCT blocks, each 4×4 DCT block containing 16 pixels (namely, four pixels in the horizontal direction and four pixels in the vertical direction in an image to be processed); a DCT transformer 3 for performing a discreet cosine transform, an exemplary orthogonal transform, for each of the 4×4 pixel blocks; an interleave field memory 4 for interleaving the DCT coefficients among a plurality of blocks, shuffling the interleaved blocks and delaying the shuffled blocks containing DCT coefficients by time corresponding to one field; a first quantizer 5 for quantizing the DCT coefficients; a Huffman coder 6 for performing a two-dimensional uffman coding for the output of the first quantizer 5; a buffer memory 7 for buffering the coded data so that the data is output at a predetermined code rate; an output terminal 8 for outputting the buffered coded data to an external device such as a video cassette recorder; a second quantizer 9 for quantizing the DCT coefficients; a class detector 10 for detecting a class data representing a code amount generated by the two-dimensional Huffman coding for the data output from the second quantizer 9; a class interleave memory 11 for interleaving the class data; a block code amount calculator 12 for calculating the code amount of each two-dimensional Huffman coded block based on the class data; and a scale factor calculator 13 for calculating the scale factor based on the block code amount.

The class detector 10, the class interleave memory 11, the block code amount calculator 12 and the scale factor calculator 13 constitute the rate controller 80.

Hereinafter, the operation of the image compression coding apparatus having the above-described configuration will be described.

The data representing one frame of image input to the input terminal 1 is divided into 4×4 DCT blocks by the blocker 2.

The data in each block are transformed into 16 DCT coefficients by the DCT transformer 3. The interleave field memory 4 including an associated memory controller therewith performs an interleave operation for the DCT coefficients, and a shuffle operation for the interleaved DCT blocks on one-block basis. The interleave field memory 4 then delays the shuffled DCT blocks by the time corresponding to one field.

As shown in FIG. 3, the interleave field memory 4 performs the interleave operation for the DCT coefficient blocks on four-block basis by rearranging the locations of four columns, each column consisting of four DCT coefficients, thereby generating the interleaved blocks.

The interleaved blocks which have been shuffled on block-basis and delayed by one field are linearly quantized by the first quantizer 5 using a quantization table produced by multiplying together the quantization steps which are different among the respective coefficients as shown in FIG. 2 and the scale factor $\alpha_{init}$ determined by the scale factor calculator 13.

The Huffman coder 6 receives the quantized DCT coefficient blocks, performs two-dimensional Huffman coding on the DCT coefficients, and then output the coded variable-length data to the buffer memory 7. The buffer memory 7 outputs the coded variable-length data at a predetermined code rate together with the scale factor $\alpha_{init}$ to the output terminal 8. The scale factor $\alpha_{init}$ is output as a fixed length code added to the variable-length coded data representing the quantized DCT coefficients.

The calculation of the scale factor $\alpha_{init}$ will be described below.

First, the DCT coefficients of the respective blocks output from the DCT transformer 3 are input to the second quantizer 9, and M different kinds of scale factors $\alpha_1$ to $\alpha_m$ (where $\alpha_1 < \alpha_2 < \ldots < \alpha_m$) are assigned to the respective blocks in one field so that the respective interleaved blocks have one and the same scale factor as shown in FIGS. 4A and 4B.

Although FIG. 4 shows that the scale factors are assigned sequentially from the left top corner to the right bottom corner of the frame to be coded, the assigning order of the scale factors onto every four blocks is not limited to sequential one. Alternatively, the assignment may be performed at random. The respective DCT coefficients are linearly quantized by a quantization table produced by multiplying together the assigned scale factor and the quantization steps shown in FIG. 2.

An output value Q from the second quantizer 9 is expressed by the following expression:

$$Q = DCT/(STEP * SF),$$

where DCT is a DCT coefficient of the DCT block, STEP is a quantization step for the DCT coefficient, SF is the assigned scale factor for the DCT coefficient block.

The class detector 10 detects the class data representing the code length when the value quantized by the second quantizer 9 is two-dimensional Huffman coded. In the class interleave memory 11, the detected class data is subjected to the same interleave operation that is performed in the interleave field memory 4.

The two-dimension Huffman coding utilizes a length of successive zeros (i.e., a zero run length) and the class data. The class data is a size of a non-zero coefficient value, in other words, the highest non-zero bit position for the non-zero coefficient expressed in binary data. If the DCT coefficient is expressed by 16-bit binary data, the class data for the DCT coefficient is expressed by 4-bit binary data. In this case, the class interleave memory 11 uses only a data capacity of 4-bit for each DCT coefficient. Accordingly, storing the class data in the class interleave memory 11 is less memory-consuming than storing the DCT coefficient data itself.

The block code amount calculator 12 calculates the code amount of the variable-length data corresponding to each of the interleaved blocks when the DCT coefficients quantized by using the M kinds of scale factors are two-dimensional Huffman coded. The block code amount calculator 12 receives the class data output from the class interleave memory 11 and calculates a zero run length based on the class data. Then the block code amount calculator 12 calculates code amount corresponding to the class data and the calculated zero run length based on relation between the class data and the zero run length, and the corresponding code amount. Such relation is stored in, for example, an associated ROM (read only memory) as a code amount table. The calculated code amount is then output to the scale factor calculator 13.

The code amounts of the respective blocks are sequentially input to the scale factor calculator 13. The scale factor calculator 13 calculates summation values of the code amounts for the respective M kinds of scale factors. Since the blocks in one field are divided into the M kinds of blocks according to the scale factor, summation of the code amounts for each of M kinds of scale factors is performed on an area which corresponds to (1/M) field in size.

Then, the code amounts $N_1$ to $N_M$ obtained by multiplying the summation values for the respective M kinds of code amounts by integer M are regarded as predicted values of the code amounts when one field is quantized by using M kinds of scale factors, respectively.

The relationship between the scale factor $\alpha_i$ and the code amount $N_i$ for each scale factor $\alpha_i$ of one field is shown in FIG. 5. Here, the integer subscript "i" ranges from 1 to M. As $\alpha_i$ increases, $N_i$ decreases. Then, the scale factor $\alpha_{init}$ for coding so that the code amount of one field becomes a predetermined target code amount is calculated. If the target code amount of one field is represented by $N_t$ and is assumed to be located between the predicted code amounts $N_2$ and $N_3$ as shown in FIG. 5, then the scale factor $\alpha_{init}$ for setting the code amount of one field to be $N_t$ is calculated by interpolating operation between the points $(\alpha_2, N_2)$ and $(\alpha_3, N_3)$ as represented by the following Expression 1.

[Expression 1]

$$\alpha_{init} = \alpha_2 + (\alpha_3 - \alpha_2)(N_2 - N_t)/(N_2 - N_3)$$

As described above, according to the method of this example, even in the case of performing the coding by interleaving the DCT coefficients in a plurality of blocks and rearranging the blocks, the code amount of each interleaved blocks is predicted by using the variable-length coded (VLC) code amounts obtained after the block is quantized by one and the same scale factor.

Therefore, even in the case of performing a two-dimensional variable-length coding in which the coding is performed by using the combination of the zero run and the class value, the data in one interleaved block, where a run of successive zeros is possibly generated, is quantized by one and the same scale factor. As a result, it is possible to predict the code amount under the same conditions as those for generating an actual code amount, thereby improving the precision in controlling the code amount.

In addition, since the interleave is performed using the class data when the respective code amounts are predicted, the amount of data corresponding to one coefficient is decreased as compared with an actual coefficient data, so that the capacity of the memory for code amount prediction is reduced.

EXAMPLE 2

Figure 6:
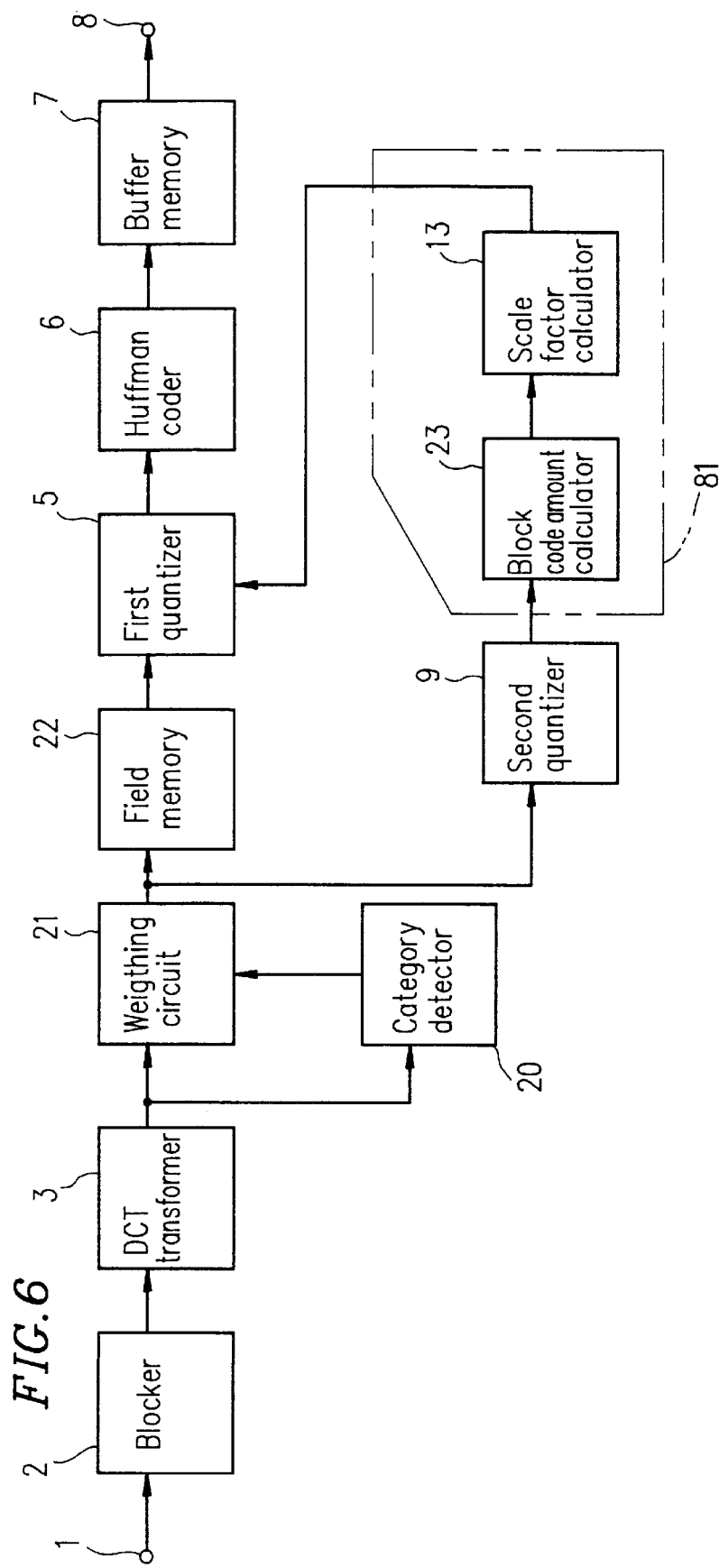
FIG. 6 is a block diagram showing a configuration for an image compression coding apparatus according to a second example of the present invention.

FIG. 6 is a block diagram showing a configuration for an image compression coding apparatus according to a second example of the present invention; FIG. 7 shows the weighting factors for the DCT coefficients; and FIG. 8 shows the assignment of the scale factors to the respective blocks.

As shown in FIG. 6, the image compression coding apparatus includes: an input terminal 1 for receiving an image data representing luminance and chrominance of each pixel; a blocker 2 for dividing the image data into 4×4 (pixel) blocks; a DCT transformer 3 for performing a discrete cosine transform (DCT), an exemplary orthogonal transform, for each of the 4×4 (pixel) blocks; a category detector 20 for detecting a category of a DCT coefficient block based on the DCT coefficients of the block; a weighting circuit 21 for weighting the DCT coefficients based on the detected category; a field memory 22 for delaying the weighted DCT coefficients by time corresponding to one field; a first quantizer 5 for quantizing the DCT coefficients; a Huffman coder 6 for performing a two-dimensional Huffman coding for the output of the first quantizer 5; a buffer memory 7 for buffering the coded data so that the data is output at a predetermined code rate; an output terminal 8; a second quantizer 9 for quantizing the DCT coefficients; a block code amount calculator 23 for calculating the code amount of each two-dimensional Huffman coded block based on the quantized data; and a scale factor calculator 13 for calculating the scale factor based on the block code amount.

The block code amount calculator 23 and the scale factor calculator 13 constitute the rate controller 81.

Hereinafter, the operation of the image compression coding apparatus having the above-described configuration will be described.

The data input to the input terminal 1 is divided into 4×4 (pixel) DCT blocks by the blocker 2 in the similar manner described in the first example. In this example, since the data represents color image, the data divided into the DCT blocks includes luminance DCT blocks and chrominance DCT blocks.

The data in each DCT block is transformed into 16 DCT coefficients ($D_0$ to $D_{15}$, where the DCT coefficient $D_0$ is DC component, and the DCT coefficients $D_1$ to $D_{15}$ are AC components in each block) by the DCT transformer 3. The luminance DCT blocks are transformed into luminance DCT coefficient blocks. The chrominance DCT blocks are transformed into chrominance DCT coefficient blocks.

The category detector 20 first calculates an activity value (ACT) of the AC components in each of luminance DCT coefficient blocks and chrominance DCT coefficient blocks by the following Expression 2.

[Expression 2]

$$ACT = \sum_{i=1}^{15}(D_i)^2$$

Next, the category detector 20 categorizes the luminance DCT coefficient blocks into three categories $YCT_0$ to $YCT_2$ based on the two kinds of threshold values $YT_0$ and $YT_1$ (where, $YT_0 < YT_1$) so as to satisfy the following Expression 3.

[Expression 3]

$YCT_0$: ACT<$YT_0$ $YCT_1$: $YT_0 \leq$ ACT<$YT_1$ $YCT_2$: $YT_1 \leq$ ACT

The category detector 20 categorizes, on the contrary, the chrominance DCT coefficient blocks into two categories $CCT_0$ and $CCT_1$ based on one kind of threshold value CT so as to satisfy the following Expression 4.

[Expression 4]

$CCT_0$: ACT<CT $CCT_1$: CT$\leq$ACT

The weighting circuit 21 performs weighting operation on the luminance and the chrominance DCT coefficient blocks based on the detected categories. The weighting is performed by multiplying the DCT coefficients by a weighting table corresponding to the category shown in FIG. 7, respectively. The weighted DCT coefficients are delayed by the field memory 22 by the time corresponding to one field.

The delayed data is linearly quantized by the first quantizer 5 using a quantization table produced by multiplying together the quantization steps which are different among the respective coefficients as shown in FIG. 2 and the scale factor $\alpha_{init}$ determined by the scale factor calculator 13.

The Huffman coder 6 receives the quantized DCT coefficients included in the luminance and the chrominance DCT coefficient blocks, performs two-dimensional Huffman coding on the DCT coefficients, and then output the coded variable-length data to the buffer memory 7. The buffer memory 7 outputs the coded variable-length data at a predetermined code rate together with the scale factor $\alpha_{init}$ and the category for the respective DCT coefficient blocks to the output terminal 8. The scale factor $\alpha_{init}$ and the category are output as a fixed length code added to the variable-length coded data representing the quantized DCT coefficients.

The calculation of the scale factor $\alpha_{init}$ will be described below.

First, the DCT coefficients weighted by the weighting circuit 21 are input to the second quantizer 9, and M different kinds of scale factors $\alpha_1$ to $\alpha_M$ (where $\alpha_1 < \alpha_2 < \ldots < \alpha_M$) are assigned to the respective blocks in one field as shown in FIG. 8.

Although FIG. 8 shows that the scale factors are assigned sequentially from the left top corner to the right bottom corner of the frame to be coded, the assigning order of the scale factors onto every four blocks is not limited to sequential one. Alternatively, the assignment may be performed at random. The respective DCT coefficients are linearly quantized by a quantization table produced by multiplying together the assigned scale factor and the quantization steps shown in FIG. 2.

The block code amount calculator 23 calculates the code amount of the variable-length data corresponding to each of the blocks when the DCT coefficients quantized by using the M kinds of scale factors are two-dimensional Huffman coded. The block code amount calculator 23 receives the class data output from the second quantizer 9 and calculates a zero run length based on the class data. Then the block code amount calculator 23 calculates code amount corresponding to the class data and the calculated zero run length based on relation between the class data and the zero run length, and the corresponding code amount. Such relation is stored in, for example, an associated ROM (read only memory) as a code amount table. The calculated code amount is then output to the scale factor calculator 13.

The code amounts of the respective blocks are sequentially input to the scale factor calculator 13. The scale factor calculator 13 calculates summation values of the code amounts for the respective M kinds of scale factors. Since the blocks in one field are divided into the M kinds of blocks according to the scale factor, summation of the code amounts for each kind of scale factors are performed on an area corresponding to (1/M) field in size.

Then, the code amounts $N_1$ to $N_M$ obtained by multiplying the summation values for the respective M kinds of code amounts by integer M are regarded as predicted values of the code amounts when one field is quantized by using M kinds of scale factors, respectively.

The relationship between the scale factor $\alpha_i$ and the code amount $N_i$ for each scale factor $\alpha_i$ of one field is shown in FIG. 5. Here, the integer subscript "i" ranges from 1 to M. As $\alpha_i$ increases, $N_i$ decreases. Then, the scale factor $\alpha_{init}$ for coding so that the code amount of one field becomes a predetermined target code amount is calculated. If the target code amount of one field is represented by $N_t$ and is assumed to be located between the predicted code amounts $N_2$ and $N_3$ as shown in FIG. 5, then the scale factor $\alpha_{init}$ for setting the code amount of one field to be $N_t$ is calculated by interpolating between the points ($\alpha_2$, $N_2$) and ($\alpha_3$, $N_3$) as represented by the Expression 1.

As described above, according to the method of this example, the quantization characteristics is adaptively changed in accordance with the local features of the image blocks so that the high frequency components of a block having a high activity value (ACT) are coarsely quantized and that a block having a low activity is uniformly quantized, and then the code amounts corresponding to the scale factors is predicted based on the results of the adaptive processing.

As a result, the precision in controlling the code amount is improved. In addition, it is possible to optimize the adaptive processing for a luminance signal and a chrominance signal, respectively, and to reduce additional information representing the category to a minimum level. It is also obvious that the precision in controlling the code amount is secured in such a case.

In this example, the step width of each coefficient used for the quantization is fixed at a constant value. Alternatively, it is possible to adaptively vary the step width of the coefficient in accordance with the scale factors. In such a case, a similar rate control is performed, and the quantization characteristics is optimized more precisely.

Example 3

Figure 9:
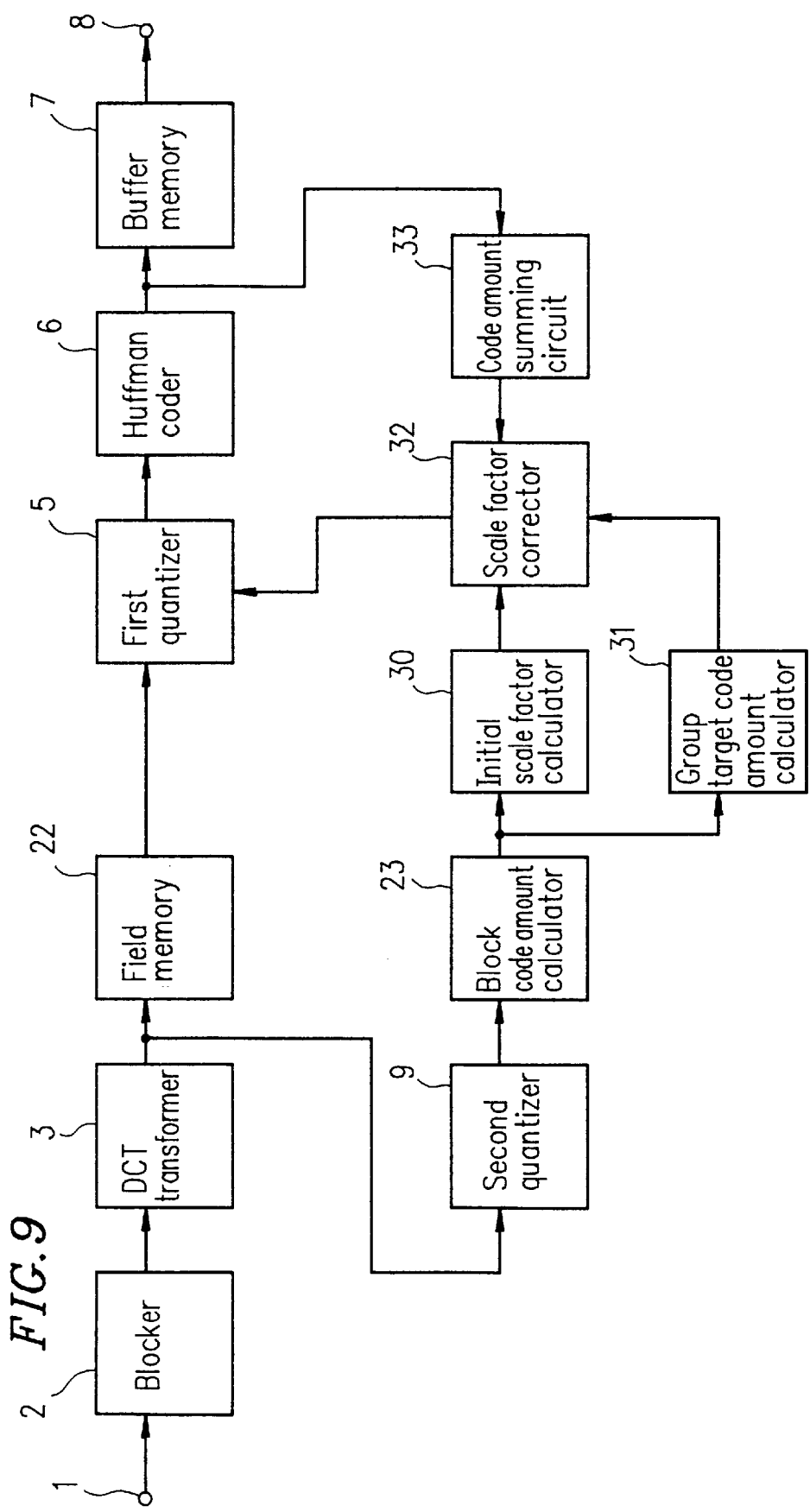
FIG. 9 is a block diagram showing a configuration for an image compression coding apparatus according to a third example of the present invention.
Figure 10:
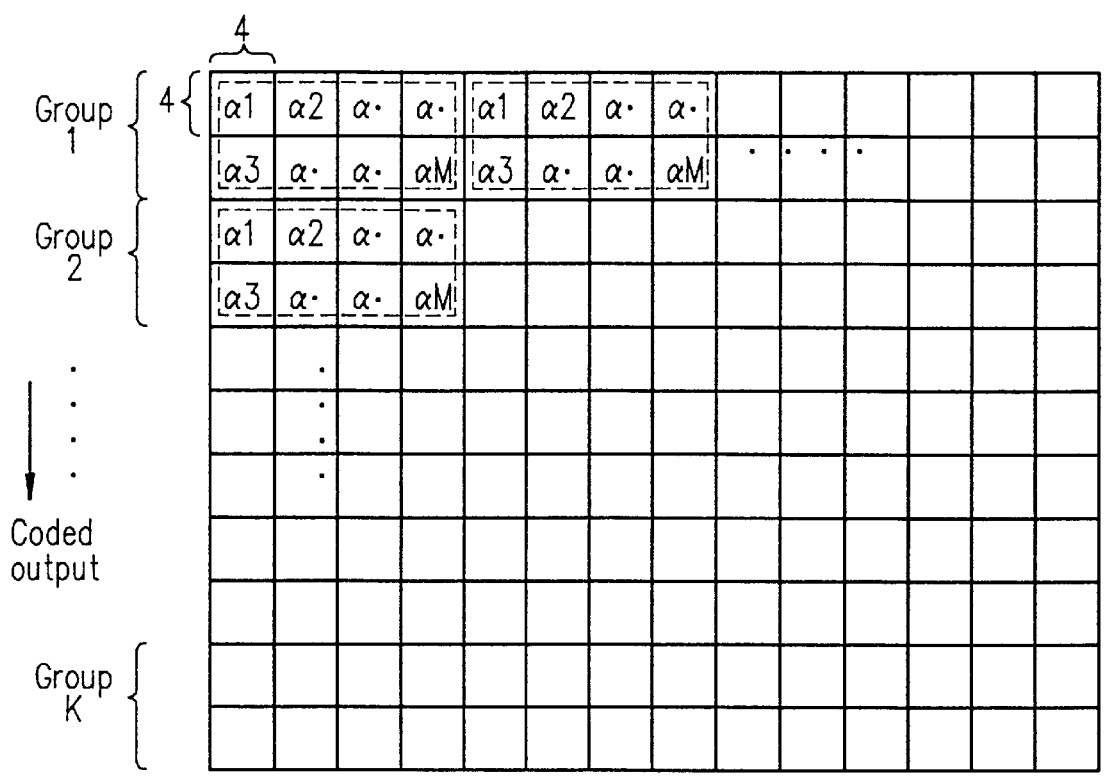
FIG. 10 shows the assignment of the scale factors and the groups to the respective blocks.
Figure 11:
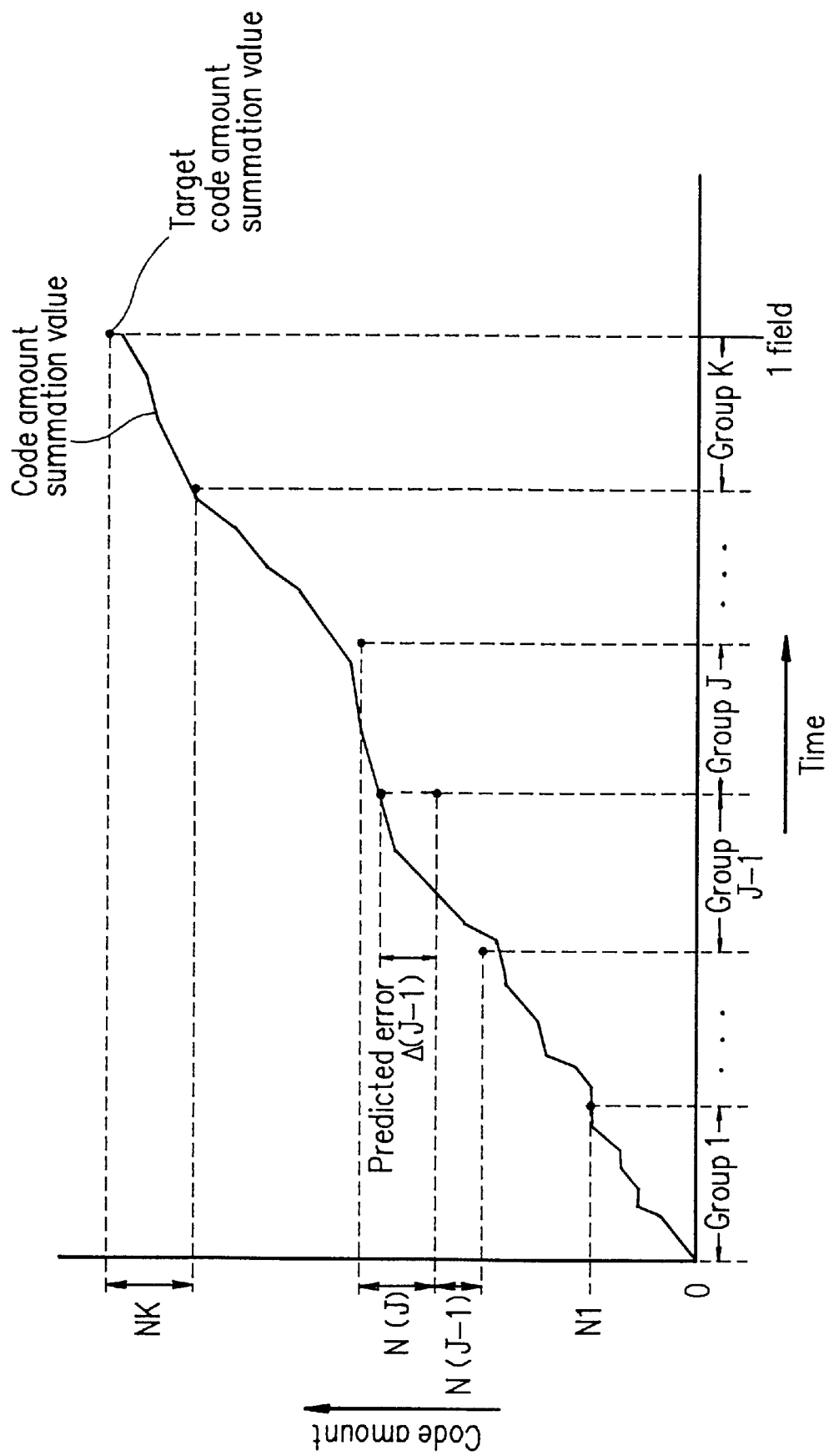
FIG. 11 is a graph showing the relationship between the code amount summation value of the coded output and the time history of the summation value of the target code amount.
Figure 12:
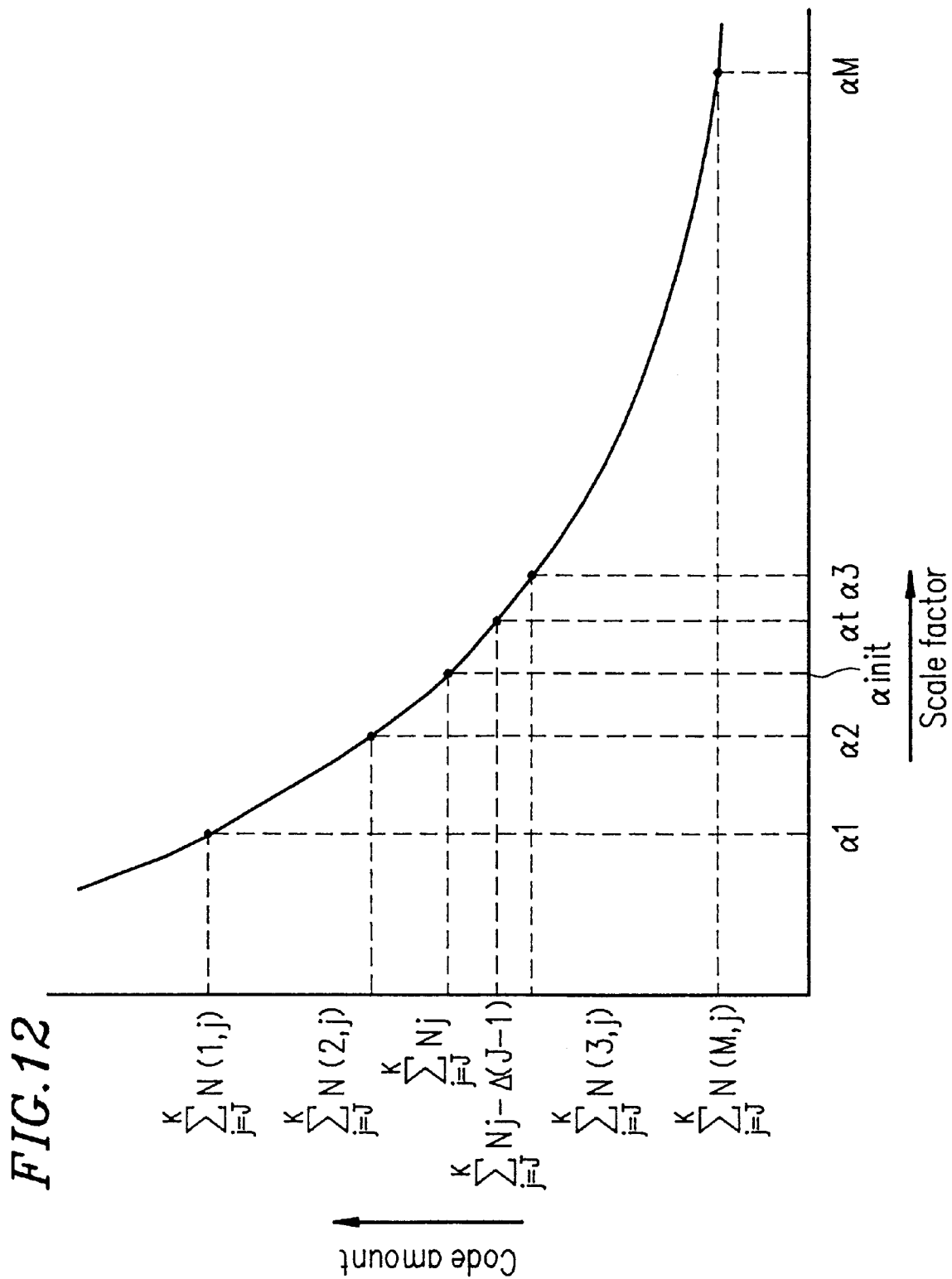
FIG. 12 is a graph showing the relationship between the scale factor and the code amount after the group J.

FIG. 9 is a block diagram showing a configuration for an image compression coding apparatus according to a third example of the present invention; FIG. 10 shows the assignment of the scale factors and the groups to the respective blocks; FIG. 11 is a graph showing the relationship between the summation value of the output code amount and the target code amount; and FIG. 12 is a graph showing the relationship between the scale factor and the code amount after the respective groups are coded.

As shown in FIG. 9, the image compression coding apparatus includes: an input terminal 1 for receiving an image data; a blocker 2 for dividing the image data into 4×4 (pixel) blocks; a DCT transformer 3 for performing a discrete cosine transform (DCT), an exemplary orthogonal transform, for each of the 4×4 blocks; a field memory 22 for delaying the DCT coefficients by time corresponding to one field; a first quantizer 5 for quantizing the DCT coefficients; a Huffman coder 6 for performing a two-dimensional Huffman coding for the output of the first quantizer 5; a buffer memory 7 for buffering the coded data so that the data is output at a predetermined code rate; an output terminal 8; a second quantizer 9 for quantizing the DCT coefficients; a block code amount calculator 23 for calculating the code amount of each two-dimensional Huffman coded block from the output of the second quantizer 9; an initial scale factor calculator 30 for calculating an initial scale factor based on the block code amount; a group target code amount calculator 31 for predicting the target code amount of each group in one field; a scale factor corrector 32 for determining the scale factor of the first quantizer 5 from the initial scale factor and the actual code amount; and a code amount summing circuit 33 for summing up the code amounts of the Huffman coded data.

Hereinafter, the operation of the image compression coding apparatus having the above-described configuration will be described.

The data input through the input terminal 1 is divided into 4×4 DCT (pixel) blocks by the blocker 2. The data in each block are transformed into 16 DCT coefficients by the DCT transformer 3 and then output to the field memory 22 and the second quantizer 9. Next, the data is delayed by the time corresponding to one field by the field memory 22. The delayed DCT coefficients are linearly quantized by the first quantizer 5 using a quantization table produced by multiplying together the quantization steps which are different among the respective coefficients as shown in FIG. 2 and the scale factor $\alpha_{init}$ determined by the scale factor corrector 32.

The Huffman coder 6 receives the quantized DCT coefficients, performs two-dimensional Huffman coding on the DCT coefficients, and then output the coded variable-length data to the buffer memory 7. The buffer memory 7 outputs the coded variable-length data at a predetermined code rate together with the scale factor $\alpha_{init}$ to the output terminal 8. The corrected scale factor $\alpha_t$ is output as a fixed length code added to the variable-length coded data representing the quantized DCT coefficients.

The calculation of the scale factor $\alpha_{init}$ will be described below.

First, the DCT coefficients output from the DCT transformer 3 are input to the second quantizer 9, and M different kinds of scale factors $\alpha_1$ to $\alpha_M$ (where $\alpha_1 < \alpha_2 < \ldots < \alpha_m$) are assigned to the respective blocks in one field as shown in FIG. 10. The field are divided into K kinds of groups (namely, group 1 to group K) corresponding to the order of the output coded data.

Although FIG. 10 shows that the scale factors are assigned sequentially from the left top corner to the right bottom corner of the frame to be coded, the assigning order of the scale factors onto every four blocks is not limited to sequential one. Alternatively, the assignment may be performed at random. The respective DCT coefficients are linearly quantized by a quantization table produced by multiplying together the assigned scale factor and the quantization steps shown in FIG. 2.

The block code amount calculator 23 calculates the code amount of the variable-length data corresponding to each of the blocks when the DCT coefficients quantized by using the M kinds of scale factors are two-dimensional Huffman coded. The block code amount calculator 23 receives the class data output from the second quantizer 9 and calculates a zero run length based on the class data. Then the block code amount calculator 23 calculates code amount corresponding to the class data and the calculated zero run length based on relation between the class data and the zero run length, and the corresponding code amount. Such relation is stored in, for example, an associated ROM (read only memory) as a code amount table. The calculated code amount is then output to the initial scale factor calculator 30 and the group target code amount calculator 31.

The initial scale factor calculator 30 receives sequentially the code amounts of the respective blocks input thereto and calculates the summation values of the code amounts corresponding to M kinds of scale factors for each group previously assigned.

Then, the relationship between the scale factors and the code amount corresponding to one field is predicted based on the relationship between the scale factors and the code amount corresponding to each group in the field. If the summation of the code amounts at a scale factor $\alpha_i$ ($1 \leq i \leq M$) in a group j ($1 \leq j \leq K$) is represented by N (i, j), then it is predicted that the code amount $N_i$ when the data of one field is quantized by the scale factor $\alpha_i$ is obtained by multiplying the summation of the code amounts quantized by the scale factor $\alpha_i$ in the respective groups and a number M corresponding to the kinds of the scale factors as represented by the following Expression 5.

[Expression 5]

$$N_i = M \cdot \sum_{j=1}^{K} N(i, j)$$

The relationship between the scale factor $\alpha_i$ and the code amount $N_i$ for each scale factor $\alpha_i$ of one field is shown in FIG. 5. As $\alpha_i$ increases, $N_i$ decreases. Then, an initial scale factor $\alpha_{init}$ for coding so that the code amount of one field becomes a predetermined target code amount is calculated. If the target code amount of one field is represented by $N_t$ and is assumed to be located between the predicted code amounts $N_2$ and $N_3$ as shown in FIG. 5, then the initial scale factor $\alpha_{init}$ for setting the code amount of one field to be $N_t$ is calculated by interpolating between the points $(\alpha_2, N_2)$ and $(\alpha_3, N_3)$ as represented by Expression 1.

The group target code amount calculator 31 receives the summation N (i, j) of the code amounts at the scale factor $\alpha_i$ in the respective groups L to K and calculates the summation value of the code amounts when the quantization is performed for each of groups (or, for group 1 to group K) by using the initial scale factor $\alpha_{init}$.

The summation $N_{ti}$ of the code amounts when the blocks to which the scale factor $\alpha_i$ is assigned are quantized by the initial scale factor $\alpha_{init}$ is obtained by the following Expression 6.

[Expression 6]

$$N_{ti} = \left\{ Nt \times \sum_{j=1}^{K} Bk(i, j) \right\} / \left\{ \sum_{i=1}^{M} \sum_{j=1}^{K} Bk(i, j) \right\},$$

where Bk (j,k) is a number of blocks assigned to group j among blocks corresponding to the scale factor $\alpha_j$, wherein i ranges from 1 to M, and j ranges from 1 to K (i, j: integer).

Therefore, the code amount of blocks belonging to the group j of the plurality of blocks to which the scale factor $\alpha_i$ is assigned is predicted as a value obtained by normalizing N (i, j) by $N_{ti}$ as represented by the following Expression 7.

[Expression 7]

$$N_a(i, j) = N_{ti} \times \{N(i, j)\} / \left\{ \sum_{j=1}^{K} N(i, j) \right\},$$

The summation $N_j$ of the code amounts when the blocks belonging to the group j are quantized by using the scale factor $\alpha_{init}$ is calculated by the following Expression 8.

[Expression 8]

$$N_j = \sum_{i=1}^{M} N_a(i, j),$$

The scale factor corrector 32 receives the predicted code amounts $N_j$ of the respective groups which have been calculated by the group target code amount calculator 31 and calculates summation of the predicted code amount $N_j$ for j=1 to (K−L) when each of K groups is coded.

The code amount summing circuit 33 summates the amount of the data actually coded by the Huffman coder 6 and outputs the summation of the actual code amounts to the scale factor corrector 32.

The relationship between the target code amount summation value and the code amount summation value is shown in FIG. 11. As shown in FIG. 11, the difference between the target code amount summation value and the code amount summation value is regarded as a prediction error Δ. Every time the data of each group has been output, the scale factor $\alpha_t$ of the next group is corrected based on the prediction error Δ.

For example, when the coding of a group (J−1) is finished, the prediction error between the predicted code amount summation value of the group (J−1) and an actual code amount summation value is assumed to be expressed by A (J−1). Then, by outputting to the first quantizer 5 a scale factor $\alpha_t$ for setting the target code amount from the beginning of the group J until the end of the coding of the one field to the following Expression 9 and then coding the quantized data output from the first quantizer 5 by the Huffman coder 6, the prediction error Δ (J−1) is cancelled and the code amount summation value when the coding of the next group is finished is corrected to be closer to the target code amount summation value.

[Expression 9]

$$\sum_{j=J}^{K} Nj - \Delta(J-1)$$

The scale factor $\alpha_t$ is calculated by linearly interpolating (as represented by the following Expression 10) the scale factor $\alpha_t$ for setting the summation of the code amounts after the group J is coded to Expression 9 based on the relationship between the scale factor and the code amount after each group is coded (FIG. 12).

[Expression 10]

$$\alpha_t = \alpha_{init} + \{(\alpha_3 - \alpha_{init}) \cdot \Delta(J-1)\} / \left\{ \sum_{j=J}^{K} Nj - \sum_{=J} N(3, j) \right\}$$

In the case where the prediction error Δ is 0, or the first group of one field is coded, the quantization is performed by regarding $\alpha_t$ as equal to $\alpha_{init}$.

As described above, according to the method of this example, an initial scale factor $\alpha_{init}$ for quantizing the code amount to be a target code amount of one field is calculated by the initial scale factor calculator 30 based on the block code amount obtained by classifying the DCT blocks of one field into a number K of groups and quantizing the blocks by M different kinds of scale factors. In addition, in predicting the code amount of each group in the order of the coded and output groups which have been quantized by the initial scale factor $\alpha_{init}$, the code amount is predicted by normalizing the code amount based on the assigned scale factors even when the number of the blocks of each group corresponding to each scale factor is set to be an arbitrary number. As a result, the precision of the predicted code amount of each group is improved.

Moreover, the code amount is controlled by the scale factor corrector 32 based on the error between the actual code amount summed by the code amount summing circuit 33 and the target code amount, so that the code amount is precisely controlled M times during one field period.

Example 4

Figure 13:
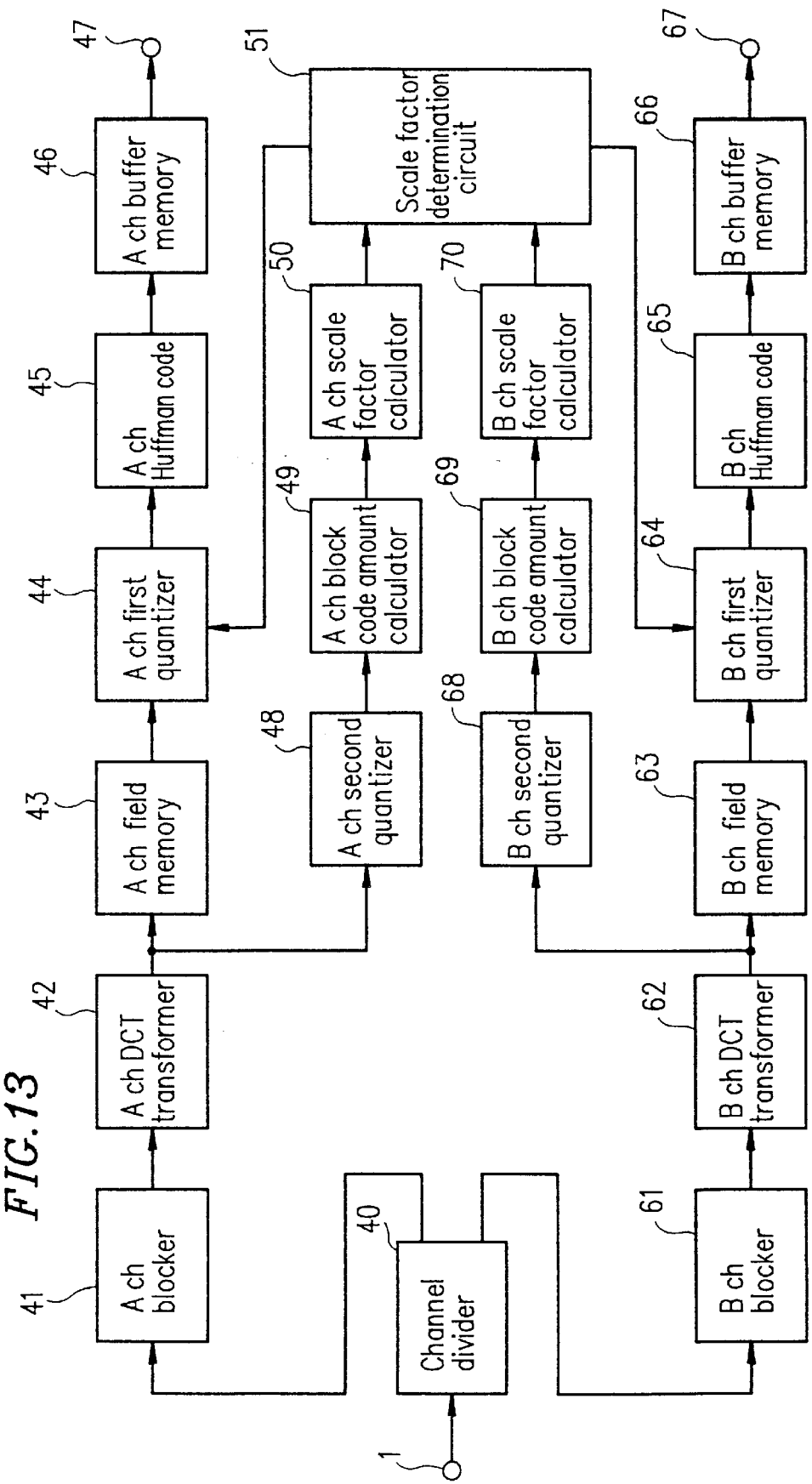
FIG. 13 is a block diagram showing a configuration for an image compression coding apparatus according to a fourth example of the present invention.
Figure 14:
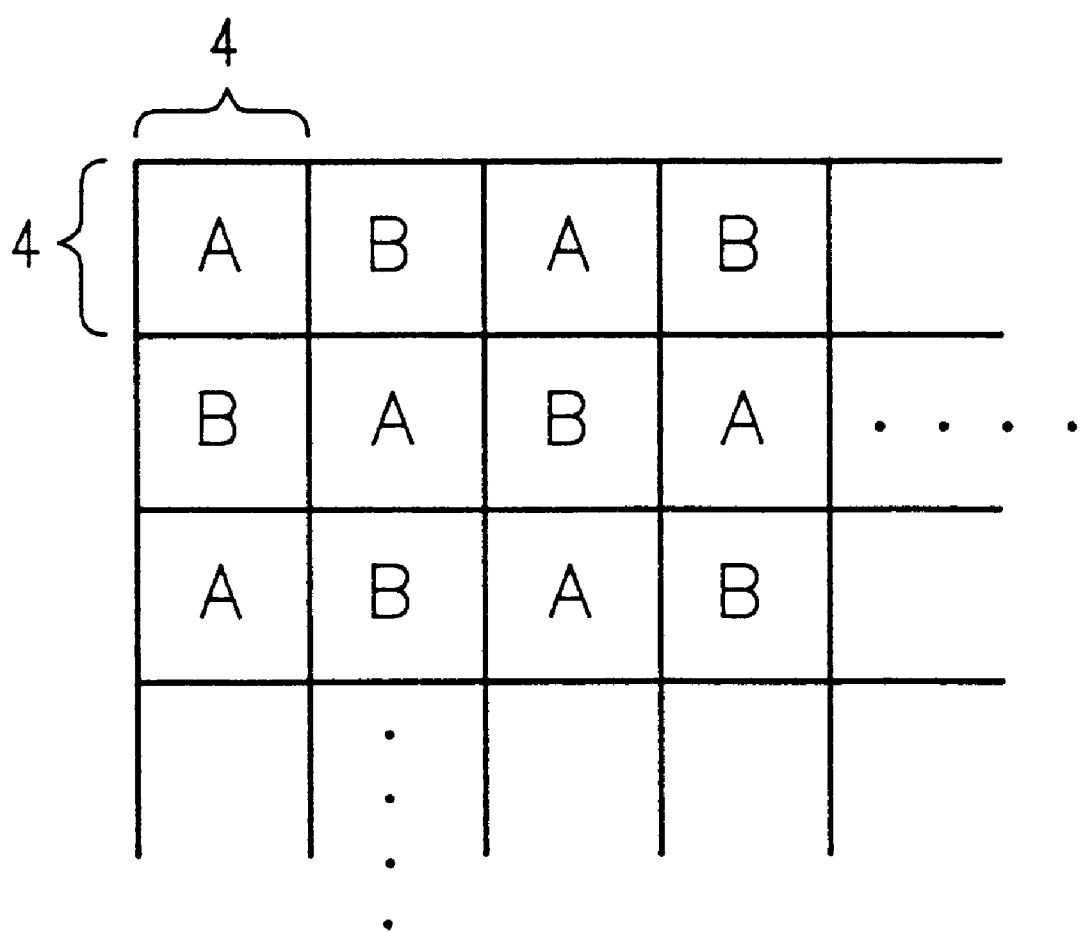
FIG. 14 shows a channel division on a screen.

FIG. 13 is a block diagram showing a configuration for an image compression coding apparatus according to a fourth example of the present invention; and FIG. 14 shows a channel division.

As shown in FIG. 13, the image compression coding apparatus includes: an input terminal 1 for receiving an image data; a channel divider 40 for dividing the image data into two channels; an A channel (A ch) blocker 41 for dividing the image data in the A ch into 4×4 blocks; an A ch DCT transformer 42 for performing a discrete cosine transform (DCT), an exemplary orthogonal transform, for each of the 4×4 blocks; an A ch field memory 43 for delaying the DCT coefficients by time corresponding to one field; an A ch first quantizer 44 for quantizing the DCT coefficients; an A ch Huffman coder 45 for performing a two-dimensional Huffman coding for the output of the first quantizer 44; an A ch buffer memory 46 for buffering the coded data so as to output the data at a predetermined code rate; an A ch output terminal 47; an A ch second quantizer 48 for quantizing the DCT coefficients; an A ch block code amount calculator 49 for calculating the code amount of each two-dimensional Huffman coded block from the output of the second quantizer 48; an A ch scale factor calculator 50 for calculating a scale factor based on the block code amount; respective B channel (B ch) processing circuits 61 to 70 corresponding to the A ch processing circuits 41 to 50; and a scale factor determination circuit 51 for determining the scale factor based on the scale factor calculation results of the two channels.

Hereinafter, the operation of the image compression coding apparatus having the above-described configuration will be described.

As shown in FIG. 14, the data input through the input terminal 1 is divided into two channels A and B by the channel divider 40. The divided data are further divided into 4×4 (pixel) DCT blocks by the blockers 41 and 61, respectively. The data in each block are transformed into 16 DCT coefficients by the DCT transformers 42 and 62, respectively.

Next, the data is delayed by the time corresponding to one field by the field memories 43 and 63. The delayed DCT coefficients are linearly quantized by the first quantizers 44 and 64 using a quantization table produced by multiplying together the quantization steps which are different among the respective coefficients as shown in FIG. 2 and the scale factor $\alpha_A$ or $\alpha_B$ determined by the scale factor determination circuit 51.

The Huffman coder 45 and 65 receive the quantized DCT coefficient blocks, performs two-dimensional Huffman coding on the DCT coefficients, and then output the coded variable-length data to the buffer memory 46 and 66. The buffer memory 46 and 66 output the coded variable-length data at a predetermined code rate together with the scale factor $\alpha_A$ or $\alpha_B$ to the output terminals 47 and 67. The scale factor $\alpha_A$ or $\alpha_B$ are output as a fixed length code added to the variable-length coded data representing the quantized DCT coefficients.

The determination of the scale factors $\alpha_A$ and $\alpha_B$ will be described below.

First, the DCT coefficients output from the DCT transformers 42 and 62 are input to the second quantizers 48 and 68, respectively, and one of the M different kinds of scale factors $\alpha_1$ to $\alpha_M$ (where $\alpha_1 < \alpha_2 < \ldots < \alpha_M$) is assigned to each of the blocks in one field as shown in FIG. 4. The respective DCT coefficients of each block are linearly quantized by a quantization table produced by multiplying together the assigned scale factor and the quantization steps shown in FIG. 2.

The block code amount calculators 49 and 69 calculate the code amount of each block when the DCT coefficients which have been quantized by using the M kinds of scale factors are two-dimensional Huffman coded.

The code amounts of the respective blocks are sequentially input to the initial scale factor calculators 50 and 70, thereby calculating the summation values of the code amounts corresponding to M kinds of scale factors. Then, the scale factors $\alpha_{Ia}$ and $\alpha_{iB}$ for coding so that the code amount of one field becomes a predetermined target code amount are calculated in the same way as in the first example.

The scale factor determination circuit 51 determines an actual scale factor so as to correspond to a differential value between the scale factors $\alpha_{Ia}$ and $\alpha_{Ib}$ calculated for the respective channels.

In the case where the differential value between the two channels is smaller than a predetermined value Y (Expression 11), the scale factors satisfying the Expression 12 are output. On the other hand, in the case where the differential value between the channels is equal to or larger than a predetermined value Y (Expression 13), the scale factors satisfying the Expression 14 are output.

[Expression 11]

$$|\alpha_{Ia} - \alpha_{ib}| < Y$$

[Expression 12]

$$\alpha_A = \alpha_B = (\alpha_{Ia} + \alpha_{Ib})/2$$

[Expression 13]

$$|\alpha_{Ia} - \alpha_{Ib}| \geq Y$$

[Expression 14]

$$\alpha_A = \alpha_{Ia}$$

$$\alpha_B = \alpha_{Ib}$$

As describe above, according to the method of this example, in dividing the image data corresponding to one field into two channels and coding the respective channels so that the code amount thereof becomes a predetermined code amount or less, the scale factor is determined in accordance with the difference between the scale factors independently calculated for the respective channels. Therefore, if the features of the input image are uniformly dispersed in the two channels, the scale factor is determined by averaging the calculation results of the two channels. On the other hand, if the features of the input image are non-uniform in the two channels, the scale factors is determined independently for the two channels. In any case, the precision in controlling the code amount is improved.

In this example, a two-channel coding method has been described. However, it is obvious that the same effects can be attained irrespective of the number of the channels.

In all the examples, a compression method on a field basis has been described. However, it is obvious that the same effects can be attained if the compression is performed on a frame basis or on a macro block (consisting of a plurality of blocks) basis.

In all the examples, the code amount is predicted by a pre-scanning method in all the blocks. However, the same effects can be attained if a part of the blocks are sampled and an operation is performed based on the blocks.

In all the examples, a DCT transform is employed as an exemplary orthogonal transform. However, it is obvious that the same effects can be attained by performing any orthogonal transform, e.g., LOT transform, an Hadamard transform and the like.

In all the examples, the DCT block size is not limited to the above-described 16 pixels.

In all the examples, the input image data is not limited to one field of the interlaced scan signal. For example, the input image data can be one frame of the progressive scan signal.

Through all the examples, the code amount calculation, the scale factor calculation, the code amount summation and the class detection can be implemented by hardware such as an application specific integrated circuit utilizing wired logic and/or programmed logic, as well as software.

As is apparent from the foregoing description, according to the present invention, the code amount can be precisely predicted even when the coding is performed by interleaving the blocks or when an adaptive quantization is performed in the respective blocks. Therefore, it is possible to increase the error resistance and adaptively improve the image quality, thereby improving the precision in controlling the code amount and the resulting image quality.

Various other modifications will be apparent to and can be readily made by those skilled in the art without departing from the scope and spirit of this invention. Accordingly, it is not intended that the scope of the claims appended hereto be limited to the description as set forth herein, but rather that the claims be broadly construed.

What is claimed is:

1. An image compression coding apparatus comprising:

an orthogonal transformer for orthogonally transforming an input image data in a plurality of blocks so as to output transform coefficients;

a memory for rearranging interleaved blocks by rearranging locations of the transform coefficients output from the orthogonal transformer among the plurality of blocks and reading out the transform coefficients of each of the interleaved blocks in a predetermined order;

a first quantizer for quantizing the transform coefficients of the interleaved blocks output from the memory;

a coder for variable-length coding an output of the first quantizer;

a second quantizer for quantizing the transform coefficients output from the orthogonal transformer by assigning one of M kinds of quantization tables following a predetermined rule so that the same quantization table is assigned to the same one of the transform coefficients constituting the interleaved blocks; and a rate controller for calculating a code amount obtained when an output of the second quantizer is variable-length coded for the respective interleaved blocks and predicting M kinds of code amounts obtained when one screen is quantized by the M kinds of quantization tables based on results of the calculation, so as to determine a quantization table for setting the code amount of the one screen to be a predetermined code amount and output the quantization table to the first quantizer wherein M is a natural number.

2. An image compression coding apparatus comprising:

an orthogonal transformer for orthogonally transforming an input image data in a plurality of blocks so as to output transform coefficients;

a first memory for rearranging interleaved blocks by rearranging locations of the transform coefficients output from the orthogonal transformer among the plurality of blocks and reading out the transform coefficients of each of the interleaved blocks in a predetermined order;

a first quantizer for quantizing the transform coefficients of the interleaved blocks output from the memory;

a coder for variable-length coding an output of the first quantizer;

a second quantizer for quantizing the transform coefficients output from the orthogonal transformer by assigning one of M kinds of quantization tables following a predetermined rule so that the same quantization table is assigned to the same one of the transform coefficients constituting the interleaved blocks;

a class detector for outputting a class data representing a level of a data output from the second quantizer;

a second memory, to which the class data is input, for rearranging locations of the class data in an order of the interleave; and a rate controller for calculating a code amount obtained when the class data output from the second memory is variable-length coded for the respective interleaved blocks and predicting M kinds of code amounts obtained when one screen is quantized by the M kinds of quantization tables based on results of the calculation, so as to determine a quantization table for setting the code amount of the one screen to be a predetermined code amount and output the quantization table to the first quantizer wherein M is a natural number.

* * * * *